(12) United States Patent
Liu et al.

(10) Patent No.: US 7,536,419 B2
(45) Date of Patent: May 19, 2009

(54) SLAVE REPLICA MEMBER

(75) Inventors: Huisheng Liu, Sammamish, WA (US); Nikolaj S. Bjorner, Woodinville, WA (US); Guhan Suriyanarayanan, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 306 days.

(21) Appl. No.: 11/364,239

(22) Filed: Feb. 28, 2006

(65) Prior Publication Data

US 2007/0112887 A1 May 17, 2007

Related U.S. Application Data

(60) Provisional application No. 60/736,773, filed on Nov. 15, 2005.

(51) Int. Cl.
*G06F 17/30* (2006.01)
*G06F 17/00* (2006.01)

(52) U.S. Cl. .................. 707/200; 707/10; 709/203; 709/211

(58) Field of Classification Search .................. 707/201, 707/1, 10, 200; 709/201, 203, 208, 211
See application file for complete search history.

(56) References Cited

U.S. PATENT DOCUMENTS 5,787,262 A    7/1998  Shakib et al.
6,928,467 B2 * 8/2005  Peng .......................... 709/219
2003/0149709 A1 * 8/2003  Banks ........................ 707/200
2004/0186916 A1   9/2004  Bjorner
2005/0015413 A1 * 1/2005  Teodosiu et al. ............ 707/201
2007/0026373 A1 * 2/2007  Suriyanarayanan et al. . 434/322

FOREIGN PATENT DOCUMENTS

EP    1160682    5/2001

OTHER PUBLICATIONS

"WINS Tombstoning", WindowsNetworking.com, 2004 http://web.archive.org/web/20040812230106/http://www.windowsnetworking.com/nt/atips/atips180.shtml.*
"Oracle8i Replication—Release 8.1.5" Feb. 1999; pp. 1-1 through 1-16; pp. 6-1 through 6-58; Retrieved from the Internet: URL:http://www.csee.umbc.edu/help/oracle8/server.815/a67791.pdf.

* cited by examiner

*Primary Examiner*—Mohammad Ali
*Assistant Examiner*—Brannon W Smith
(74) *Attorney, Agent, or Firm*—Workman Nydegger

(57) ABSTRACT

Aspects of the subject matter described herein relate to resource replication systems. In aspects, a mechanism is described that maintains replicated resources on a slave member that participates in a replica group. The slave member detects that a local resource has been updated locally. If the resource was created locally in the update, the slave member deletes the local resource. Otherwise, the slave member determines an upstream partner from which to install a replacement resource and then installs the replacement resource. In aspects, this behavior undoes local updates to local resources that occur on the slave member.

16 Claims, 7 Drawing Sheets

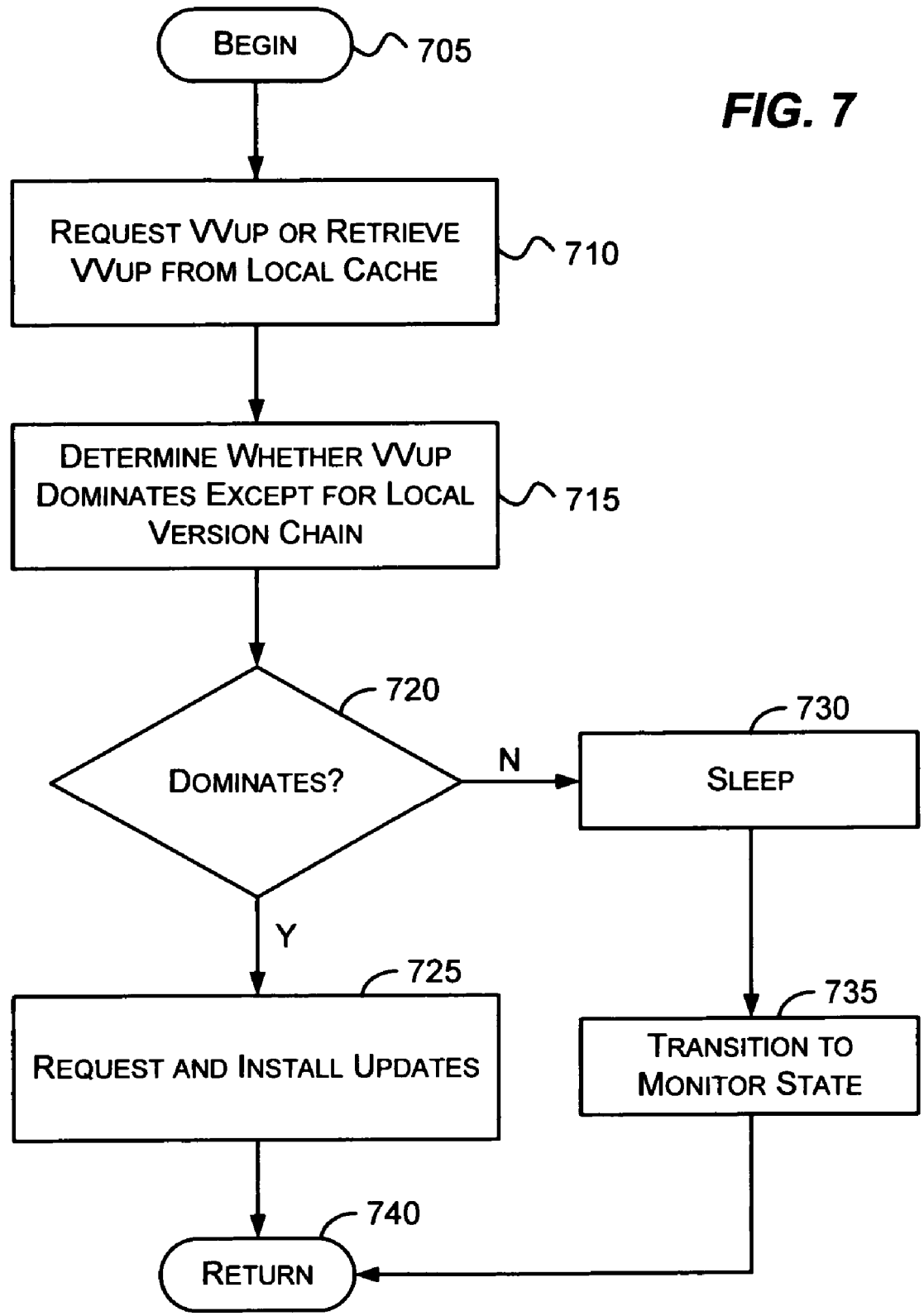

SLAVE REPLICA MEMBER

CROSS REFERENCE TO RELATED APPLICATION

This application claims the benefit of U.S. Provisional Application No. 60/736,773, filed Nov. 15, 2005, entitled SELECTIVE/SINGLE MASTER, which application is incorporated herein in its entirety.

BACKGROUND

Systems for replicating resources are becoming increasingly important to ensure availability and fault tolerance in large networks. Corporate networks that replicate files containing domain credentials and policies are one example where availability, scalability, consistency, and reliability are needed. Creating a flexible resource replication system that allows various replication behaviors, however, is challenging.

SUMMARY

Briefly, aspects of the subject matter described herein relate to resource replication systems. In aspects, a mechanism is described that maintains replicated resources on a slave member that participates in a replica group. The slave member detects that a local resource has been updated locally. If the resource was created locally in the update, the slave member deletes the local resource. Otherwise, the slave member determines an upstream partner from which to install a replacement resource and then installs the replacement resource. In aspects, this behavior undoes local changes to local resources that occur on the slave member.

This Summary is provided to briefly identify some aspects of the subject matter that is further described below in the Detailed Description. This Summary is not intended to identify key or essential features of the claimed subject matter, nor is it intended to be used to limit the scope of the claimed subject matter.

The phrase "subject matter described herein" refers to subject matter described in the Detailed Description unless the context clearly indicates otherwise. The term "aspects" should be read as "one or more aspects". Identifying aspects of the subject matter described in the Detailed Description is not intended to identify key or essential features of the claimed subject matter.

The aspects described above and other aspects will become apparent from the following Detailed Description when taken in conjunction with the drawings, in which:

BRIEF DESCRIPTION OF THE DRAWINGS

FIG. 7 is a flow diagram that generally represents actions corresponding to block 525 of FIG. 5 that may occur in installing a replacement resource from an upstream partner in accordance with aspects of the subject matter described herein.

DETAILED DESCRIPTION

Exemplary Operating Environment

Figure 1:
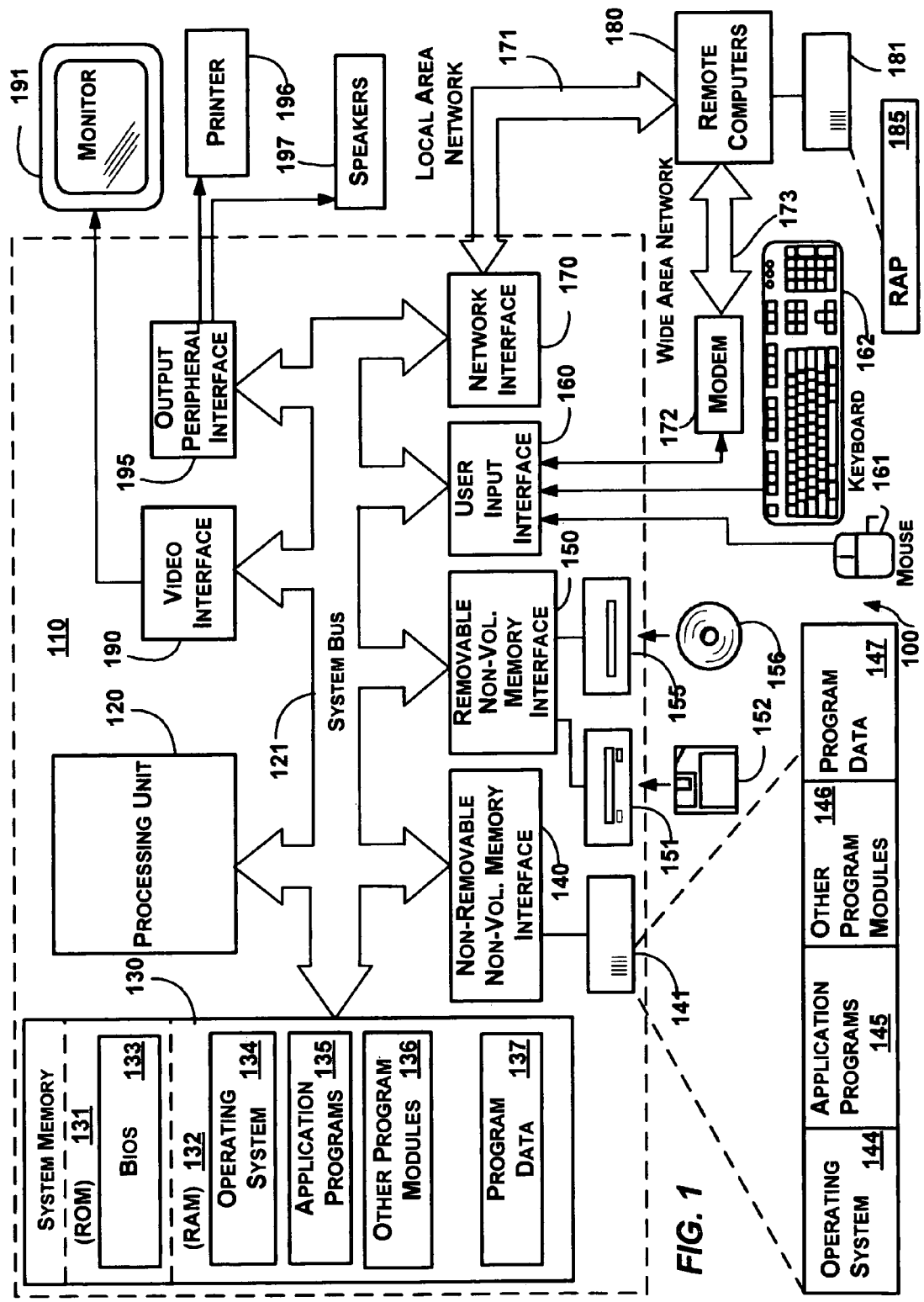
FIG. 1 is a block diagram representing a computer system into which aspects of the subject matter described herein may be incorporated.

FIG. 1 illustrates an example of a suitable computing system environment 100 on which aspects of the subject matter described herein may be implemented. The computing system environment 100 is only one example of a suitable computing environment and is not intended to suggest any limitation as to the scope of use or functionality of aspects of the subject matter described herein. Neither should the computing environment 100 be interpreted as having any dependency or requirement relating to any one or combination of components illustrated in the exemplary operating environment 100.

Aspects of the subject matter described herein are operational with numerous other general purpose or special purpose computing system environments or configurations. Examples of well known computing systems, environments, and/or configurations that may be suitable for use with aspects of the subject matter described herein include, but are not limited to, personal computers, server computers, handheld or laptop devices, multiprocessor systems, microcontroller-based systems, set top boxes, programmable consumer electronics, network PCs, minicomputers, mainframe computers, distributed computing environments that include any of the above systems or devices, and the like.

Aspects of the subject matter described herein may be described in the general context of computer-executable instructions, such as program modules, being executed by a computer. Generally, program modules include routines, programs, objects, components, data structures, and so forth, which perform particular tasks or implement particular abstract data types. Aspects of the subject matter described herein may also be practiced in distributed computing environments where tasks are performed by remote processing devices that are linked through a communications network. In a distributed computing environment, program modules may be located in both local and remote computer storage media including memory storage devices.

With reference to FIG. 1, an exemplary system for implementing aspects of the subject matter described herein includes a general-purpose computing device in the form of a computer 110. Components of the computer 110 may include, but are not limited to, a processing unit 120, a system memory 130, and a system bus 121 that couples various system components including the system memory to the processing unit 120. The system bus 121 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus.

Computer 110 typically includes a variety of computer-readable media. Computer-readable media can be any available media that can be accessed by the computer 110 and includes both volatile and nonvolatile media, and removable and non-removable media. By way of example, and not limitation, computer-readable media may comprise computer storage media and communication media. Computer storage media includes both volatile and nonvolatile, removable and non-removable media implemented in any method or technology for storage of information such as computer-readable instructions, data structures, program modules, or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by the computer 110. Communication media typically embodies computer-readable instructions, data structures, program modules, or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer-readable media.

The system memory 130 includes computer storage media in the form of volatile and/or nonvolatile memory such as read only memory (ROM) 131 and random access memory (RAM) 132. A basic input/output system 133 (BIOS), containing the basic routines that help to transfer information between elements within computer 110, such as during start-up, is typically stored in ROM 131. RAM 132 typically contains data and/or program modules that are immediately accessible to and/or presently being operated on by processing unit 120. By way of example, and not limitation, FIG. 1 illustrates operating system 134, application programs 135, other program modules 136, and program data 137.

The computer 110 may also include other removable/non-removable, volatile/nonvolatile computer storage media. By way of example only, FIG. 1 illustrates a hard disk drive 141 that reads from or writes to non-removable, nonvolatile magnetic media, a magnetic disk drive 151 that reads from or writes to a removable, nonvolatile magnetic disk 152, and an optical disk drive 155 that reads from or writes to a removable, nonvolatile optical disk 156 such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 141 is typically connected to the system bus 121 through a non-removable memory interface such as interface 140, and magnetic disk drive 151 and optical disk drive 155 are typically connected to the system bus 121 by a removable memory interface, such as interface 150.

The drives and their associated computer storage media, discussed above and illustrated in FIG. 1, provide storage of computer-readable instructions, data structures, program modules, and other data for the computer 110. In FIG. 1, for example, hard disk drive 141 is illustrated as storing operating system 144, application programs 145, other program modules 146, and program data 147. Note that these components can either be the same as or different from operating system 134, application programs 135, other program modules 136, and program data 137. Operating system 144, applications 145, other program modules 146, and program data 147 are given different numbers herein to illustrate that, at a minimum, they are different copies. A user may enter commands and information into the computer 110 through input devices such as a keyboard 162 and pointing device 161, commonly referred to as a mouse, trackball or touch pad. Other input devices (not shown) may include a microphone, joystick, game pad, satellite dish, scanner, a touch-sensitive screen of a handheld PC or other writing tablet, or the like. These and other input devices are often connected to the processing unit 120 through a user input interface 160 that is coupled to the system bus, but may be connected by other interface and bus structures, such as a parallel port, game port or a universal serial bus (USB). A monitor 191 or other type of display device is also connected to the system bus 121 via an interface, such as a video interface 190. In addition to the monitor, computers may also include other peripheral output devices such as speakers 197 and printer 196, which may be connected through an output peripheral interface 195.

The computer 110 may operate in a networked environment using logical connections to one or more remote computers, such as a remote computer 180. The remote computer 180 may be a personal computer, a server, a router, a network PC, a peer device or other common network node, and typically includes many or all of the elements described above relative to the computer 110, although only a memory storage device 181 has been illustrated in FIG. 1. The logical connections depicted in FIG. 1 include a local area network (LAN) 171 and a wide area network (WAN) 173, but may also include other networks. Such networking environments are commonplace in offices, enterprise-wide computer networks, intranets and the Internet.

When used in a LAN networking environment, the computer 110 is connected to the LAN 171 through a network interface or adapter 170. When used in a WAN networking environment, the computer 110 typically includes a modem 172 or other means for establishing communications over the WAN 173, such as the Internet. The modem 172, which may be internal or external, may be connected to the system bus 121 via the user input interface 160 or other appropriate mechanism. In a networked environment, program modules depicted relative to the computer 110, or portions thereof, may be stored in the remote memory storage device. By way of example, and not limitation, FIG. 1 illustrates remote application programs 185 as residing on memory device 181. It will be appreciated that the network connections shown are exemplary and other means of establishing a communications link between the computers may be used.

Resource Replication

As will readily be appreciated, modern machines may process thousands of resource changes in a relatively short period of time. Replicating these resources and keeping them synchronized across hundreds or thousands of machines connected via various networks of varying reliability and bandwidth poses a significant challenge.

Optimistic, multi-master replication systems allow unrestricted changes to replicated content on any machine participating in a given replica group. A replica group comprises a set of resources which are replicated on machines participating in the replica group. The set of resources of a replica group may span volumes. For example, a replica group may include resources associated with C:\DATA, D:\APPS, and E:\DOCS which may be replicated on a set of machines participating in the replica group. Potentially conflicting changes are reconciled under the control of the replication system using a set of conflict resolution criteria that defines, for every conflict situation, which conflicting change takes precedence over others.

The term "machine" is not limited simply to a physical machine. Rather, a single physical machine may include multiple virtual machines. Replication from one machine to another machine, as used herein, implies replication of one or more members of the same replica group from one machine, virtual or physical, to another machine, virtual or physical. A single physical machine may include multiple members of the same replica group. Thus, replicating members of a replica group may involve synchronizing the members of a single physical machine that includes two or more members of the same replica group.

A resource may be thought of as an object. Each resource is associated with resource data and resource metadata. Resource data may include content and attributes associated with the content while resource metadata includes other attributes that may be relevant in negotiating synchronization and in conflict resolution. Resource data and metadata may be stored in a database or other suitable store; in an alternate embodiment, separate stores may be used for storing resource data and metadata.

In replication systems including data stores based on named files in a file system, resource data may include file contents, as well as any file attributes that are stored on the file system in association with the file contents. File attributes may include access control lists (ACLs), creation/modification times, and other data associated with a file. As used herein, a file may include directories (i.e., file system objects that may be associated with descendant files and directories and ancestor directories) and non-directories. Unless the context clearly indicates otherwise, the term file may be read as "resource data."

In replication systems including data stores not based on named files in a file system (e.g., ones in which resources are stored in a database or object-based data store), resource data appropriate to the data store is stored. Throughout this document, replication systems based on files in a file system are sometimes used for illustration, but it will be recognized that any data store capable of storing content may be used without departing from the spirit or scope of the subject matter described herein.

For each resource, resource metadata may include a globally unique identifier (GUID), whether the resource has been deleted, a version sequence number together with authorship of a change, a clock value to reflect the time a change occurred, and other fields, such as a digest that summarizes values of resource data and may include signatures for resource content. A digest may be used for a quick comparison to bypass data-transfer during replication synchronization, for example. If a resource on a destination machine is synchronized with content on a source machine (e.g., as indicated by a digest), network overhead may be minimized by transmitting just the resource metadata, without transmitting the resource data itself. Transmitting the resource metadata is done so that the destination machine may reflect the metadata included on the source machine in its subsequent replication activities. This may allow the destination machine, for example, to become a source machine in a subsequent replication activity. Resource metadata may be stored with or separate from resource data without departing from the spirit or scope of the subject matter described herein.

Version vectors may be used when replicating resources. A version vector may be viewed as a global set of counters or clocks of machines participating in a replica group. Each machine participating in the replica group maintains a version vector that represents the machine's current latest version and the latest versions that the machine has received with respect to other machines. Each time a resource is created, modified, or deleted from a machine, the resource's version may be set to a version number equivalent to the current version number for that machine plus one. The version vector for that machine is also updated to reflect that the version number for that machine has been incremented.

Version vectors maintain information about the state of knowledge. A version vector may map a machine identifier to a time stamp. Each machine participating in a replica group may maintain its own clock vector to record the clock values it knows that other machines have attained. The clock vectors may comprise version sequence numbers. In one embodiment, instead of maintaining a single clock value for each machine, a set of clock values may be maintained to accommodate processing updates out of order and to take advantage of basic set operations on version vectors.

During synchronization, a version vector may be transmitted for use in synchronizing resources. For example, if machines A (a downstream machine) and B (an upstream machine) engage in a synchronization activity such as a join, machine B may transmit its version vector to A. A subtracts its version vector from the version vector received from B and sends the difference to B. B may then transmit changes for all resources, if any, that have versions in the difference.

Examples of use of version vectors in synchronization have been described in U.S. patent application Ser. No. 10/791,041 entitled "Interval Vector Based Knowledge Synchronization for Resource Versioning", U.S. patent application Ser. No. 10/779,030 entitled "Garbage Collection of Tombstones for Optimistic Replication Systems", and U.S. patent application Ser. No. 10/733,459 entitled, Granular Control Over the Authority of Replicated Information via Fencing and UnFencing".

It may be desired to not have updates replicated out of certain members participating in a replica group. For example, in a publication scenario, it may not be desired to have updates from a spoke replicated back to the hub. In a data collection scenario, it may be desired to avoid making any updates on the hub. On a client, it may be desired to have some machines be able to view content of a replicated folder but not be able to update it.

Aspects of the subject matter described herein allow a system administrator or the like to set up a slave (also referred to as "read-only") member of a replica group. In short, any update on the slave member is discarded. If a file is created on the member, the file is deleted. If an existing file is deleted, the file is re-animated (e.g., undeleted). If a file is updated, the update is discarded, and the original or newer version of the file is re-installed. In addition, any local creation, deletion, or update from a slave member may not replicate out to its downstream partners.

If merge behavior (e.g., replicating in and out) is temporarily desired for a member, an administrator or the like may set the member as read/write first and then change it to slave after merging has finished. In one embodiment, a member may be set as both primary and slave. Primary in this sense means that resources from the member win and are replicated out in conflicts during synchronization with downstream partners.

In one embodiment, to set up a slave member, a read-only attribute of state data associated with the replicated folder may be set to true. The state data may be persistently stored in non-volatile memory such as a file, database, or the like.

In one implementation, the default value may be false for the read-only attribute. Thus, without intervention by an administrator or the like, a member participating in a replica group may default to being able to replicate resources in and out.

Figure 2:
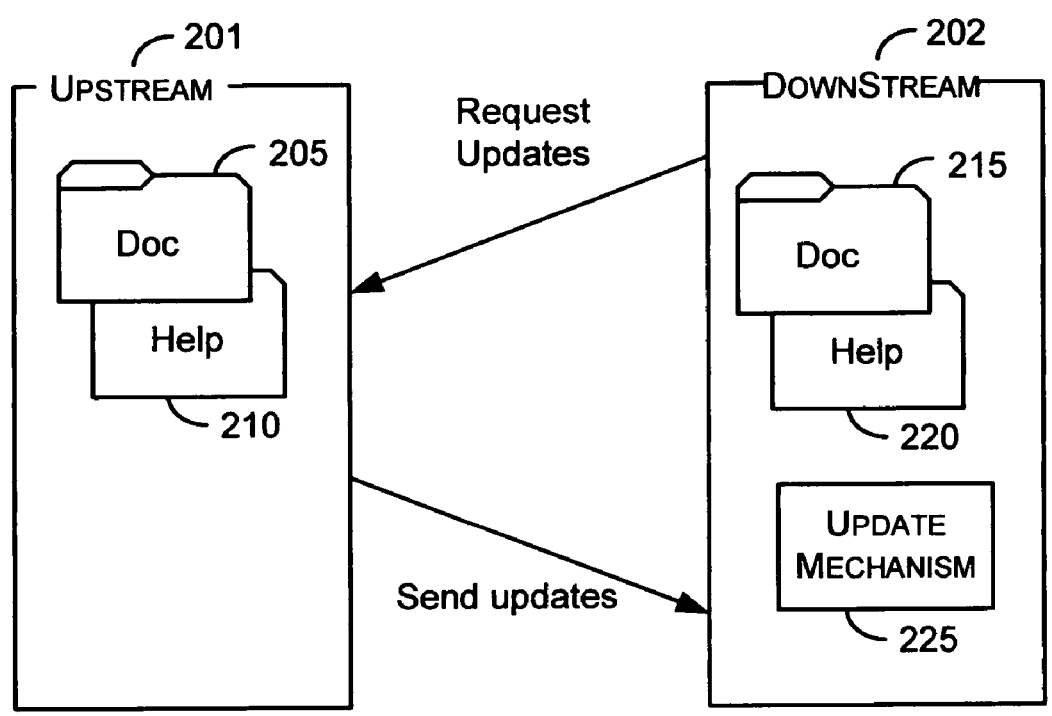
FIG. 2 is a block diagram that generally represents machines participating in a replica group in accordance with aspects of the subject matter described herein.

FIG. 2 is a block diagram that generally represents machines participating in a replica group in accordance with aspects of the subject matter described herein. As an example, an upstream machine 201 and a downstream machine 202 may participate in a replica group that includes two resources. These two resources may include, for example, documents directories 205 and 215 and help directories 210 and 220 (which are given different number on the two machines to indicate that at a particular moment in time, these resources may not include the same resource data—i.e., they may be out-of-sync).

In response to local changes, the downstream machine 202 may request updates from the upstream machine 201 the changed resources with their corresponding resources on the upstream machine 201. Although only two machines are shown in FIG. 2, the upstream and downstream machines 201 and 202 may be part of a replication system that includes many other machines. A machine that is a source in one interaction (sometimes called an upstream machine) may later become a destination (sometimes called a downstream machine) in another interaction and vice versa.

The downstream machine 202 may include an update mechanism 225 that determines when to obtain updates from the upstream machine 201. For example, if acting as a slave, the downstream machine 202 may request updates from the upstream machine 201 in response to local updates to the resource on the downstream machine 202. If the downstream machine 202 is also an upstream partner of another machine (not shown), the update mechanism 225 may also determine which updates to send to the other machine. For example, if acting as a slave, the downstream machine 202 may skip sending resources that were changed locally to the other machine.

Figure 3:
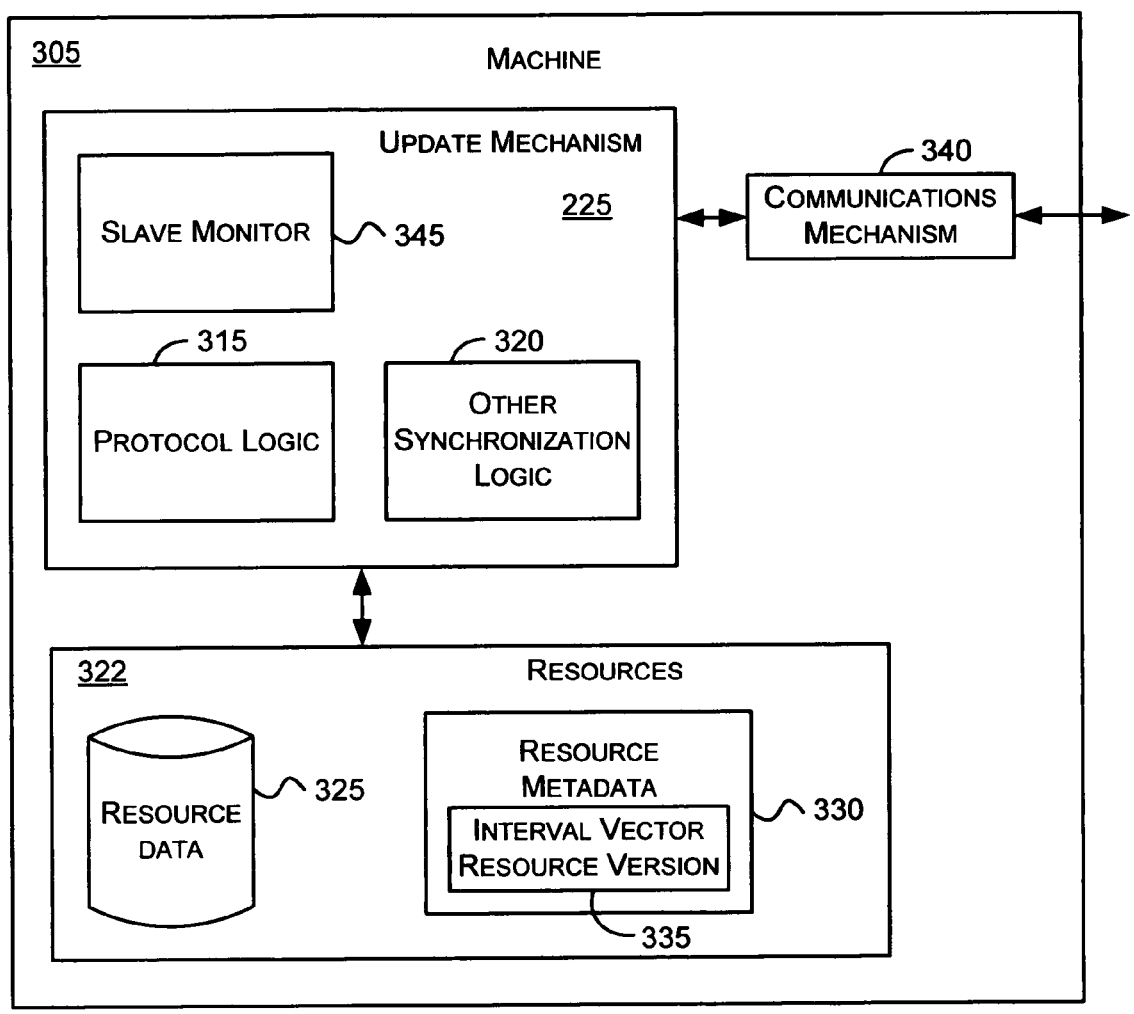
FIG. 3 is a block diagram representing a machine configured to operate in a resource replication system in accordance with aspects of the subject matter described herein.

FIG. 3 is a block diagram representing a machine configured to operate in a resource replication system in accordance with aspects of the subject matter described herein. The machine 305 includes an update mechanism 225, resources 322, and a communications mechanism 340. The update mechanism includes a slave monitor 345, protocol logic 320, and other synchronization logic 320.

The resources 322 include the resource data store 325 for storing resource data and the resource metadata store 330. Although shown in the same box, the resource data store 325 may be stored together or in a separate store relative to the resource metadata store 330. Among other things, the resource metadata store 330 may include versions for each of the resource data records stored in the resource store 325 and may also include an interval vector (block 335).

The communications mechanism 340 allows the update mechanism 225 to communicate with other update mechanisms (not shown) on other machines. The communications mechanism 340 may be a network interface or adapter 170, modem 172, or any other means for establishing communications as described in conjunction with FIG. 1.

The update mechanism 225 includes protocol logic 315 that operates to communicate with other replication partners. The other synchronization logic 320 includes synchronization logic other than the protocol logic (e.g., what to do in case of conflicting updates, how to determine which updates to obtain, and so forth). Although the protocol logic 315 and the other synchronization logic 320 are shown as separate boxes, in other embodiments, they may be combined in whole or in part.

As used herein, replication service may include any one or more of the components described above in conjunction with FIG. 3.

In operation, the machine 305 may operate as a downstream machine and/or an upstream machine. A downstream machine may establish a connection with an upstream machine for a replica group in which both the upstream and downstream machines participate. This may be done through the communications mechanism 340, for example. In establishing the connection, each of the partners (i.e., the upstream and downstream machines) may send its version vector to the other partner. Then, a session is established to send updates from the upstream machine to the downstream machine.

A session may be used to bind a replicated folder of an upstream machine with its corresponding replicated folder of a downstream machine. A session may be established for each replicated folder of a replica group. The sessions for multiple folders may be established over a single connection between the upstream and downstream machines.

After all updates from a session have been processed or abandoned, the downstream machine may close the session.

The downstream machine may request (e.g., via the communications mechanism 340) that the upstream machine notify the downstream machine when updates for any resources associated with the session occur. When the upstream machine notifies the downstream machine that updates are available, the downstream machine may request the version vector for the updates. In response the upstream machine sends its version vector (sometimes referred to as "VVup"). Note that VVup may include a complete version vector or a version vector that includes changes since the last version vector was sent. Notifying the downstream machine that updates are available and waiting for the downstream machine to request the updates may be performed in two steps so that a downstream machine is not accidentally flooded with version vectors from multiple upstream partners.

The downstream machine uses the upstream version vector it receives (i.e., "VVup") and computes a set-difference with its own version vector to compute versions residing on the upstream machine of which the downstream machine is unaware. The downstream machine may then request metadata regarding the versions. In requesting the updates, the downstream machine may include a delta version vector that indicates which updates the downstream machine needs.

A downstream machine may request for tombstones or live updates separately or together. A tombstone represents that a resource has been deleted and live updates represent updates that do not delete a resource. In some implementations, the downstream machine may request tombstones before it requests live updates. This may be done to improve efficiency as a resource that has been modified and then deleted does not need to be modified before it is deleted on a replication partner. In addition, processing a tombstone before a live update may clear a namespace of the data store (e.g., in a file system) of the downstream machine in preparation for processing a live replacement update.

After receiving the updates, the downstream machine may begin processing the updates to determine which resource data or portion thereof associated with the updates to request from the upstream machine. This processing, for example, may be performed through the other synchronization logic 340 which may be broken into multiple components (not shown). For example, an update may indicate that resource data of a particular resource or a portion thereof has been changed. In one embodiment, all the resource data associated with the resource may be requested by the downstream machine. In another embodiment, a portion of the resource data that includes the change may be requested by the downstream machine. As used herein, an interaction (e.g., request, response, update, and so forth) involving resource data should be understood to mean an interaction involving a portion or all of the resource data associated with a resource. For example, a request for resource data may mean a request for a portion or all of the resource data associated with a resource.

After determining resource data that needs to be requested, the downstream machine may request the resource data. In response, to a request for resource data, the upstream machine may send the resource data associated with a resource. Requests and responses may continue until all resource data which the downstream machine has determined needs to be updated has been requested. Note, that not all resource data may be sent as an upstream machine may no longer have a requested resource data if the resource has been deleted, for example. Another example in which resource data may not be sent is if the only effective change relative to the downstream machine is that the resource was renamed or that metadata attributes were updated. In such cases, receiving the update and renaming a local resource or updating local metadata may be all that is needed to synchronize the downstream resource with the upstream resource.

A session may be closed, for example, if a replicated folder is deleted, if a non-recoverable error occurs during replication, or if a replication system is shut down. Otherwise, the established session may be used for subsequent synchronization actions that involve all or a portion of the events above.

The update mechanism 225 may use a database (e.g., resource metadata store 330) to keep track of file and directory states of resource data in the resource data store 325. Each time a resource is updated, the resource may be assigned a new version in the database.

The update mechanism 225 may receive updates from an upstream partner and update local resources so that they are in sync with replicated resources on the upstream partner. Updates to the resource metadata may be stored in the resource metadata store 330 while updates to the resource data may be stored in resource data store 325. In one embodiment, the resource data store 325 and the resource metadata store 330 may be included on the same volume or physical device (e.g., hard drive).

The resource data may also be changed by local file activity related to the resource data. For example, the downstream machine may serve as a file server to many client machines (not shown). The client machines may access and modify resource data (e.g. as files) on the downstream machine. The update mechanism 225 may include a resource data change monitor (not shown) that may monitor for changes to replicated resources (e.g., changes to files). When a replicated resource changes, the resource change monitor may update the resource metadata store 330 to indicate the update. This may serve to keep the resource metadata store 330 in sync with the resource data 325 and for synchronization between replica group members.

Slave Behavior

When acting as a slave, the update mechanism 225 may include a slave monitor 345. The slave monitor 345 may be implemented as a task that is associated with an inbound connection (hereinafter "InConnection"). An InConnection is a connection from which a downstream machine receives updates from an upstream machine. There may be an InConnection for each upstream partner of a downstream machine. In one embodiment, there is a slave monitor 345 for each InConnection. In another embodiment, the slave monitor 345 may be shared among multiple InConnections.

Figure 4:
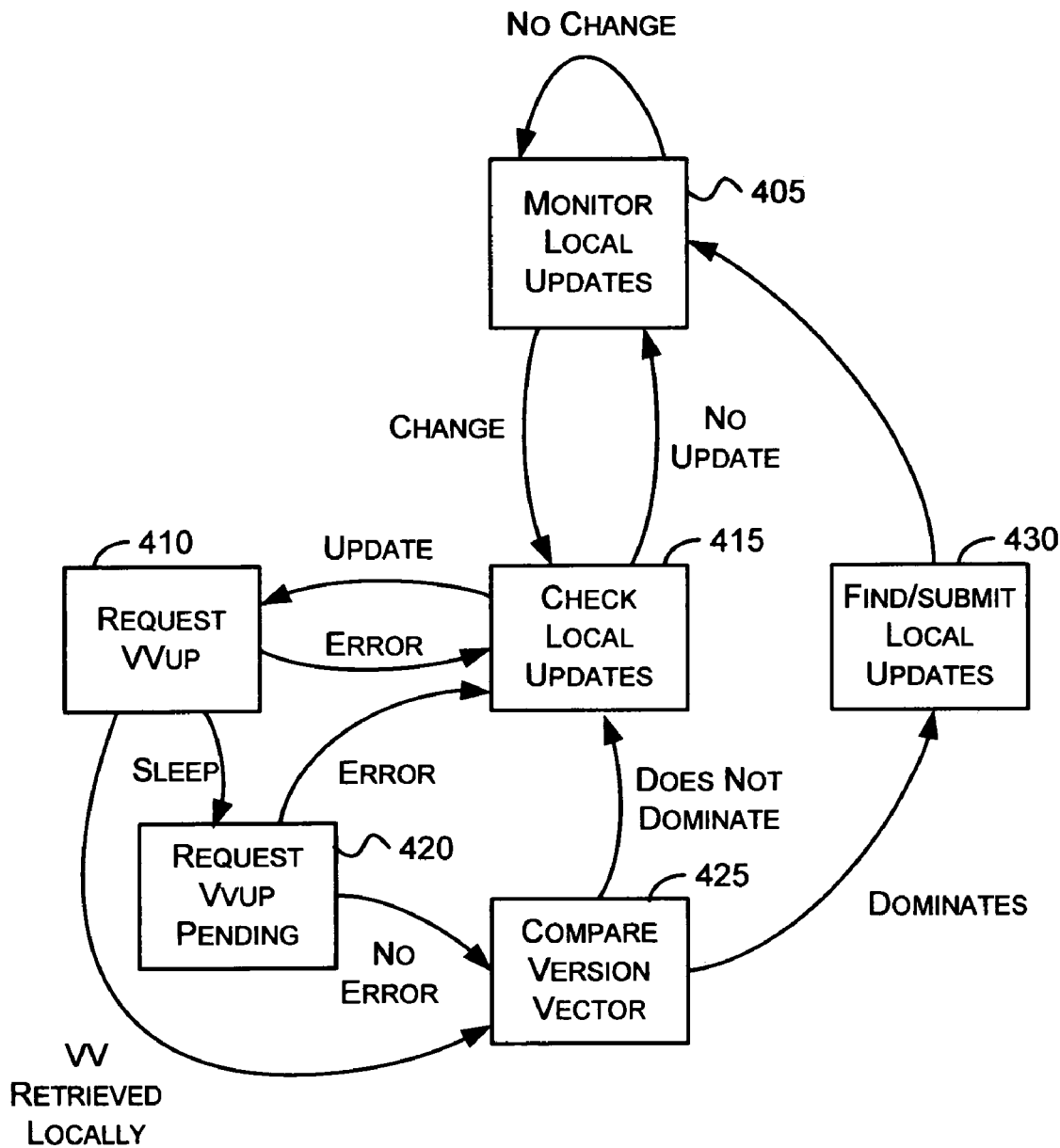
FIG. 4 is a state diagram that illustrates some exemplary states associated with a slave monitor in accordance with aspects of the subject matter described herein.

FIG. 4 is a state diagram that illustrates some exemplary states associated with a slave monitor in accordance with aspects of the subject matter described herein. When it first starts, the slave monitor may start in a monitor local updates state 405. As a first activity in this state, the slave monitor may request (e.g., via GetNewLocalVersionChain( )) a new up-to-date copy of the version vector residing on the local slave machine that includes a summary of the changes that originated on the slave. In response, the slave monitor may be provided a local version chain that includes a summary of changes that originated on the slave and that were made to resources on the slave machine. If no new version is available, the slave monitor's request may be queued to receive local chain change notification. When a new version of the version vector is available, the slave monitor may be awakened. If there is no change to the local chain, the slave monitor transitions to the monitor local updates state 405. The slave monitor may determine if there is a change by comparing a new version chain with a version chain saved from a previous session.

If there are updates to the local version chain or if updates from previous sessions were dropped, the slave monitor may transition to a check local updates state 415.

After a new version chain is retrieved, the slave monitor may examine the resource metadata store to determine if the changes are from local updates before the slave monitor asks for a version vector of an upstream partner. A flag (e.g., internalUpdate) for each resource may indicate whether a version change results from a local change or a remote update. To determine if changes are from local updates, the slave monitor may use the flags to remove updates associated with remote changes and then calculate a delta between the new version chain and a saved earlier version. In addition, dropped versions from previous sessions may be added to the delta. Afterwards, the slave monitor may then search in the resource metadata for any update that is dominated by the delta.

If the slave monitor determines that there are no local updates, it may transition back to the monitor local updates state 405. Otherwise, the slave monitor may transition to the request VVup state 410.

In the request VVup state 410, the slave monitor may request a version vector from the upstream partner of the InConnection associated with the slave monitor. If there are already too many outstanding requests or if an error occurs, the slave monitor may transition back to the check local updates state 415 after sleeping for a period of time. If the slave monitor determines that the slave monitor will use a cached version of VVup, the slave monitor transitions to the compare version vector state 425. Otherwise, the slave monitor sleeps and transitions to the request VVup pending state 420.

The slave monitor may be awakened when it receives the VVup or an error occurs. If an error occurred in receiving the VVup the slave monitor transitions to the check local updates state 415. Otherwise, the slave monitor transitions to the compare version vector 425 state.

In the compare version vector state 425, the slave monitor may use the version vector retrieved from the upstream partner or local cache to decide if it is safe to go to this particular upstream partner to pull original or newer content of a local updated resource. "Safe" in this context means that the upstream partner's version vector dominates except for a local version chain for a particular resource. The phrase "a version vector dominates another one" is a synonym for the corresponding inclusion relation between the version vectors.

For example, with three machines named A, B, and C with A being the upstream machine and B being the slave machine, if A's version vector is (A->5, B->6, C->7) and B's version vector is (A->5, B->15, C->6), A's version vector dominates B's version vector except for B's local version chain. Thus, A is a "safe" upstream partner from which B may obtain original or newer content of a local updated resource. If C is also an upstream machine to B and C's version vector is (A->4, B->6, C->7), C is not a "safe" upstream partner from which B may obtain original or newer content of a local updated resource as C's version vector does not dominate B's version vector even with the local chain (i.e., B->15) excluded.

If the upstream partner's version vector does not dominate, the slave monitor may sleep for a period of time and then transition back to the check local updates state 415. While the slave monitor is sleeping, a slave monitor task on one of the other connections may have restored the resource from a "safe" upstream partner.

If the upstream partner's version vector dominates, the slave monitor may transition to the find/submit local updates state 430. In this state, the slave monitor may inject updates into the update mechanism 225. If an update corresponds to a new locally created resource and the resource has not been replicated, which can be determined by a flag on the resource meta-data (e.g., uidVisible=0), the resource and its meta-data is deleted.

In one embodiment, new locally created resources are detected using a globally unique resource ID (hereinafter "UID"). The UID comprises a GUID (globally unique ID) component and a version sequence number. The GUID component identifies the creator (e.g., a slave member) and is stored separately in the database. To determine whether a resource was created locally, a comparison between the database GUID and the GUID in the UID may be performed. A flag (e.g., uidVisible) may be set to 0 on locally created resources. Once the resource replicates out, the flag may be set to 1, for example.

If an update does not correspond to a new locally created resource or the update has replicated out, the update mechanism 225 creates a slave synchronization session and requests the resource from an upstream partner. If the resource does not exist on the upstream partner, the resource may be considered to be deleted on the upstream partner. In response, the resource data is deleted locally and a tombstone is set in the resource metadata. Otherwise, the updates from the upstream partner are installed locally with re-assigned local versions. In one embodiment, if the slave does not have a downstream partner, the local versions may not be re-assigned.

In one embodiment, a slave synchronization session may not change the slave's version vector when the session completes, even if a newer version of an update is downloaded from upstream. Furthermore, if an update is dropped (e.g., not completed successfully) due to repeated synchronization failure, the slave monitor may be informed and it may try to obtain the update subsequently.

After the synchronization completes, the session is closed and the slave monitor transitions to the monitor local updates state 405.

Figure 5:
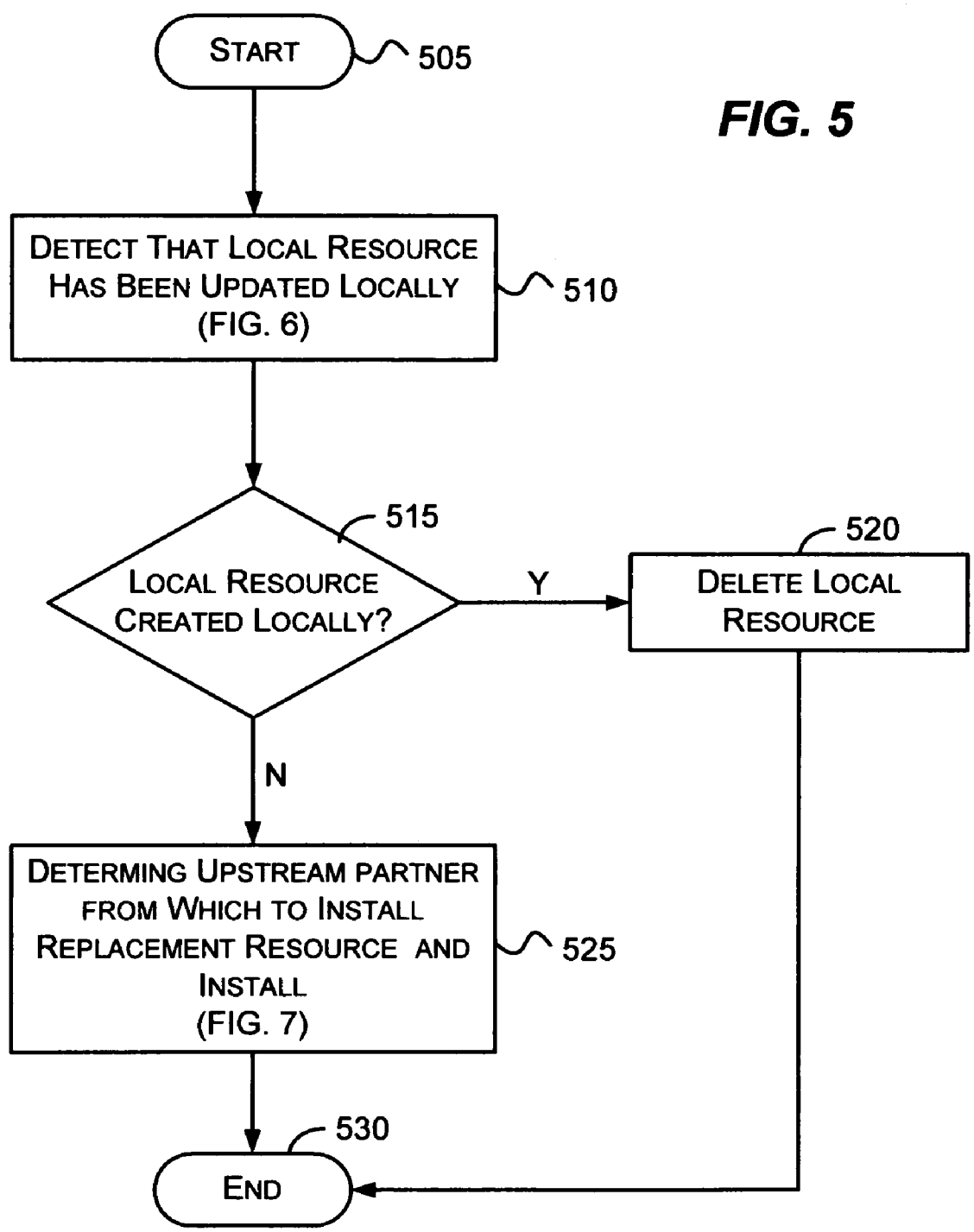
FIG. 5 is a flow diagram that generally represents actions that may occur on a slave replica member in accordance with aspects of the subject matter described herein.

FIG. 5 is a flow diagram that generally represents actions that may occur on a slave replica member in accordance with aspects of the subject matter described herein. At block 505, the actions begin.

Figure 6:
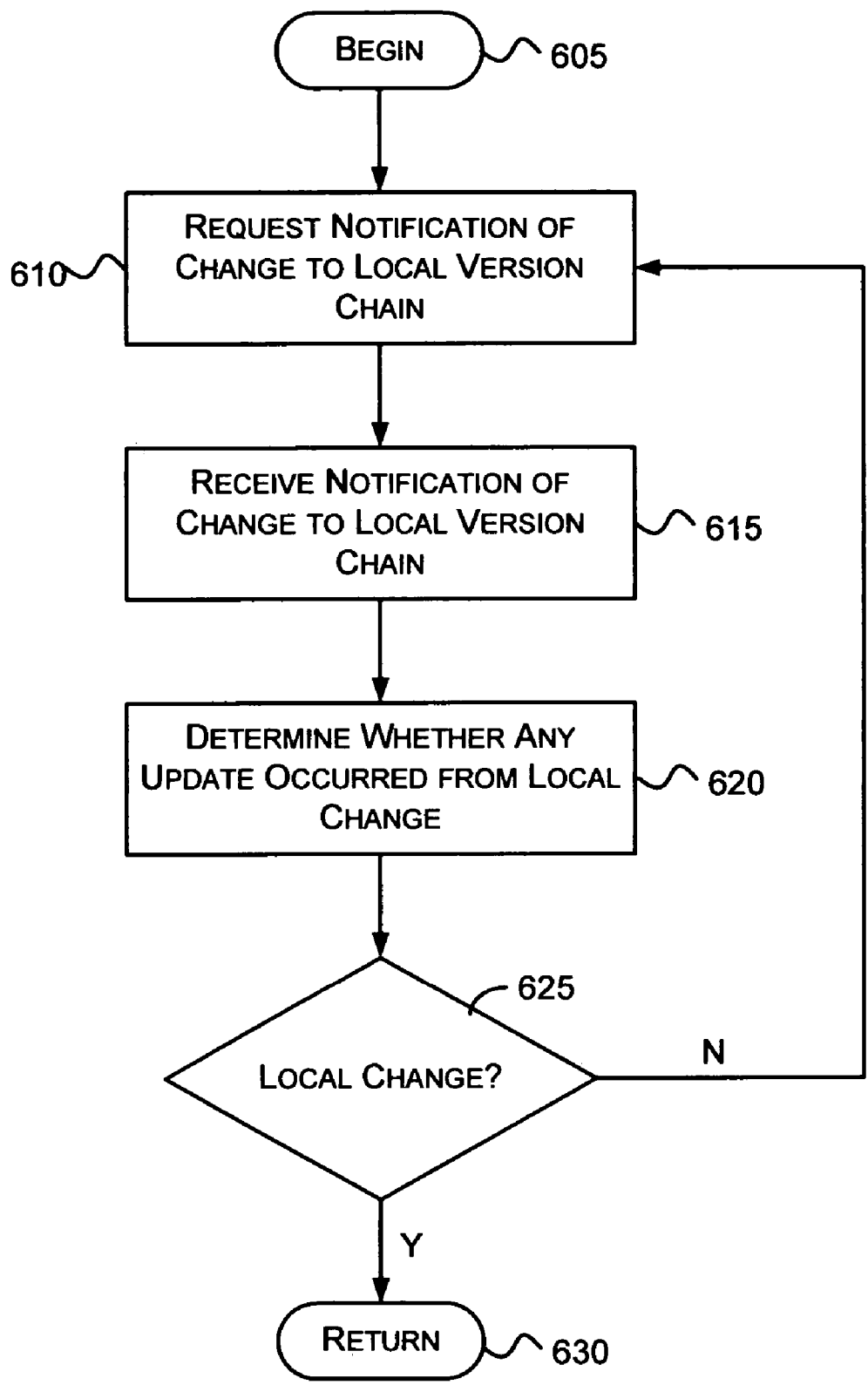
FIG. 6 is a flow diagram that generally represents actions corresponding to block 510 of FIG. 5 that may occur in detecting that a local resource has been updated locally in accordance with aspects of the subject matter described herein.

At block 510, a slave monitor detects that local resources have been updated locally as described in more detail in conjunction with FIG. 6. The term "updated locally" in this sense means that the local resource was changed in response to local resource store activity instead of being changed (e.g., via synchronization with an upstream partner) in response to changes made on another member participating in the replica group. A user changing a replicated resource of the slave replica member constitutes one example of a resource that has been updated locally.

Furthermore, while a replica member may be read-only from the perspective of a replica group, the replica member may be read-write from the perspective of a user accessing replicated resources on the replica member. In one embodiment, a user accessing replicated resources, even on a slave replica member, may have the ability to modify or delete any existing resource or add new resources.

At block 515, a determination is made as to whether the resource was created locally in the update. If so, the actions continue at block 520; otherwise, the actions continue at block 525. An update may include the creation of a local resource. For example, a user may create a new word processing document and save the document under a replicated folder. Local (non-replicated) creations may be indicated by a flag (e.g., uidVisible=0) as indicated previously.

At block 520, the resource is deleted.

At block 525, an upstream partner from which to install a replacement resource is determined and the replacement resource is installed from the upstream partner as described in more detail in conjunction with FIG. 7.

At block 530, the actions end.

FIG. 6 is a flow diagram that generally represents actions corresponding to block 510 of FIG. 5 that may occur in detecting that a local resource has been updated locally in accordance with aspects of the subject matter described herein. At block 605, the actions begin.

At block 610, notification of change to a local version chain is requested. At block 615, notification of a change to the local version chain is received. At block 620, a determination is made as to whether any update represented by the local version chain corresponds to a resource that was updated locally. If any of the updates corresponds to a resource that was update locally, at block 625, the actions continue at block 630. Otherwise, the actions continue at block 630 and from there continue at block 515 of FIG. 5.

FIG. 7 is a flow diagram that generally represents actions corresponding to block 525 of FIG. 5 that may occur in installing a replacement resource from an upstream partner in accordance with aspects of the subject matter described herein. At block 705, the actions begin.

At block 710, a VVup is requested from an upstream partner or retrieved from a local cache. At block 715, a determination is made as to whether the VVup dominates a local version vector except for the local version chain. If so, at block 720 the actions continue at block 725; otherwise, the action continue at block 730.

At block 725, the updates corresponding to the changed resources are requested and installed. Note, this may involve installing a version of the resource that existed on the slave replica member just prior to the local update or may involve installing a version that is newer than what existed on the slave replica member just prior to the local update.

At block 730, the slave monitor sleeps. At block 735, the slave monitor transitions to the monitor local updates state. At block 740, the actions continue at block 530 of FIG. 5.

Note that the actions associated with FIG. 7 may be occurring in parallel or interleaved with actions occurring in conjunction with other slave monitors. While an upstream partner associated with InConnection monitored by one slave monitor may not have a version vector that dominates the local version vector (except for the local version chain), another upstream partner associated with another InConnection typically will. Thus, the replacement resource may come from another upstream partner if VVup does not dominate the local version vector.

Furthermore, in one embodiment, determining an upstream partner from which to install a replacement resource may comprise the first slave monitor associated with an InConnection that determines that the slave monitor's upstream partner has a version vector that dominates the local version vector and injects an update request for a replacement resource into the update mechanism.

It should be understood that the actions described in conjunction with FIGS. 5-7 are not all-inclusive of all the actions a slave replica member participating in a replica group may take when replicating resources. Furthermore, although the actions are described as occurring in a particular order, in other embodiments, some of the actions may occur in parallel or may be performed in another order without departing from the spirit or scope of the subject matter described herein.

As can be seen from the foregoing detailed description, aspects have been described related to shutdown recovery for resource replication systems. While aspects of the subject matter described herein are susceptible to various modifications and alternative constructions, certain illustrated embodiments thereof are shown in the drawings and have been described above in detail. It should be understood, however, that there is no intention to limit aspects of the claimed subject matter to the specific forms disclosed, but on the contrary, the intention is to cover all modifications, alternative constructions, and equivalents falling within the spirit and scope of various aspects of the subject matter described herein.

What is claimed is:

1. A computer-readable storage medium having stored computer-executable instructions which when executed perform a method for replacing local versions of resources that have been updated locally rather than remotely in a replicating network wherein each computer of the replicating network stores resources of the replicating network such that each individual computer stores resources that correspond to the individual computer and also stores replicas of resources that correspond to the other computers of the replicating network, comprising:

at a slave monitor of an update mechanism, the slave monitor running on a slave computer of the replicating network, the slave monitor requesting a local version vector which resides on the slave computer, the local version vector representing a version of the resources of the replicating network that correspond to the slave computer and one or more versions of the resources of the replicating network that the slave computer has received that correspond to the other computers of the replicating network;

upon receiving the local version vector, the slave monitor determining based on the value of each of the versions of the version vector that changes have been made to the resources stored on the slave computer;

upon detecting that the local version vector has been updated indicating that one or more updates have been made to the resources stored on the slave computer, the slave monitor determining whether the one or more updates have been made locally rather than remotely, wherein a local update comprises an update to a resource on the slave computer that is made by the slave computer rather than an update to a resource on the slave computer that occurs through replication from one or more of the other computers of the replicating network such that:

upon determining that the one or more updates have been made remotely, the updates are allowed to be propagated to one or more of the other computers of the replicating network; and upon determining that at least one of the one or more updates was made locally rather than remotely, the slave monitor requesting a version vector from an upstream partner to which the slave computer is connected in the replicating network, and upon receiving the version vector from the upstream partner, the slave monitor using the received version vector to replace the at least one of the one or more updated resources that was updated locally on the slave computer such that:

upon determining that an updated resource on the slave computer comprises a newly created resource that was created locally by the slave computer, the slave monitor indicating that the updated resource should be deleted such that the update mechanism deletes the updated resource from the slave computer; and upon determining that an updated resource on the slave computer was updated locally by the slave computer, the slave monitor indicating that the updated resource should be replaced by a version received from the upstream partner such that the update mechanism requests a version of the updated resource from the upstream partner and replaces the updated resource with the version received from the upstream partner on the slave computer.

2. The computer-readable storage medium of claim 1, wherein the version received from the upstream partner comprises a version of the updated resource that existed on the local machine just prior to the local resource being updated locally.

3. The computer-readable storage medium of claim 1, wherein the version received from the upstream partner comprises a version of the updated resource that is newer then what existed on the local machine just prior to the local resource being updated locally.

4. The computer-readable storage medium of claim 1, wherein requesting a version vector from an upstream partner further comprises upon receiving the version vector from the upstream partner, determining whether the received version vector associated with the upstream partner dominates a local version vector except for a local version chain.

5. The computer-readable storage medium of claim 4, wherein the local version chain comprises a version number associated with local resources.

6. The computer-readable storage medium of claim 4, wherein the received version vector associated with the upstream partner dominates a local version vector except for a local version chain if for each of the other computers of the replicating network that are represented by the received version vector associated with the upstream partner except the slave computer represented by the local version chain, the version vector associated with the upstream partner indicates that the upstream partner is aware of a same or newer version than the local machine.

7. The computer-readable storage medium of claim 1, further comprising upon determining from the received version vector that the upstream partner does not have a version of the updated resource, deleting the updated resource from the slave computer.

8. The computer-readable storage medium of claim 1, wherein indicating that the updated resource should be deleted such that the update mechanism deletes the updated resource from the slave computer further comprises:

determining that the updated resource was created locally and not replicated to a downstream partner; and upon determining that the updated resource was not replicated to a downstream partner, deleting the updated resource.

9. A method implemented at least in part by a computer for replacing local versions of files that have been updated locally rather than remotely in a replicating network wherein each computer of the replicating network stores resources of the replicating network such that each individual computer stores resources that correspond to the individual computer and also stores replicas of resources that correspond to the other computers of the replicating network, the method comprising:

at a slave monitor of an update mechanism, the slave monitor running on a slave computer of the replicating network, the slave monitor requesting a local version vector which resides on the slave computer, the local version vector representing a version of the resources of the replicating network that correspond to the slave computer and one or more versions of the resources of the replicating network that the slave computer has received that correspond to the other computers of the replicating network;

upon receiving the local version vector, the slave monitor determining based on the value of each of the versions of the version vector that changes have been made to the resources stored on the slave computer;

upon detecting that the local version vector has been updated indicating that one or more updates have been made to the resources stored on the slave computer, the slave monitor determining whether the one or more updates have been made locally rather than remotely, wherein a local update comprises an update to a resource on the slave computer that is made by the slave computer rather than an update to a resource on the slave computer that occurs through replication from one or more of the other computers of the replicating network such that:

upon determining that the one or more updates have been made remotely, the updates are allowed to be propagated to one or more of the other computers of the replicating network; and upon determining that at least one of the one or more updates was made locally rather than remotely, the slave monitor requesting a version vector from an upstream partner to which the slave computer is connected in the replicating network, and upon receiving the version vector from the upstream partner, the slave monitor using the received version vector to replace the at least one of the one or more updated resources that was updated locally on the slave computer such that:

upon determining that an updated resource on the slave computer comprises a newly created resource that was created locally by the slave computer, the slave monitor indicating that the updated resource should be deleted such that the update mechanism deletes the updated resource from the slave computer; and upon determining that an updated resource on the slave computer was updated locally by the slave computer, the slave monitor indicating that the updated resource should be replaced by a version received from the upstream partner such that the update mechanism requests a version of the updated resource from the upstream partner and replaces the updated resource with the version received from the upstream partner on the slave computer.

10. The method of claim 9, wherein determining whether the one or more updates have been made locally rather than remotely comprises examining a flag associated with the updated resource, wherein the flag is set when the resource is not updated locally.

11. The method of claim 9, wherein requesting a version vector from an upstream partner further comprises determining whether the received version vector associated with the upstream partner dominates a local version vector except for a local version chain.

12. The method of claim 9, wherein requesting a version vector from an upstream partner further comprises obtaining a version vector associated with the upstream partner from a local cache and determining whether the obtained version vector dominates a local version vector except for a local version chain.

13. The method of claim 9, wherein replacing the updated resource with the version received from the upstream partner comprises receiving an indication that a resource on the upstream partner corresponding to the updated resource has been deleted and in response, marking the updated resource for deletion.

14. The method of claim 9, wherein indicating that the updated resource should be deleted such that the update mechanism deletes the updated resource from the slave computer further comprises:

determining that the updated resource was created locally and not replicated to a downstream partner; and upon determining that the updated resource was not replicated to a downstream partner, deleting the update resource.

15. In a computing environment, an apparatus, comprising:

a memory containing a resource store arranged to store resource metadata for resources that are replicated by computers arranged to participate in a replicating network; and an update mechanism arranged to detect changes to local resources and install replacement resources in response thereto such that the changes are undone, wherein the resource store is associated with a slave computer arranged to participate in the replicating network, the update mechanism comprising a slave monitor for performing the following:

requesting a local version vector which resides on the slave computer, the local version vector representing a version of the resources of the replicating network that correspond to the slave computer and one or more versions of the resources of the replicating network that the slave computer has received that correspond to the other computers of the replicating network;

upon receiving the local version vector, determining based on the value of each of the versions of the version vector that changes have been made to the resources stored on the slave computer;

upon detecting that the local version vector has been updated indicating that one or more updates have been made to the resources stored on the slave computer, determining whether the one or more updates have been made locally rather than remotely, wherein a local update comprises an update to a resource on the slave computer that is made by the slave computer rather than an update to a resource on the slave computer that occurs through replication from one or more of the other computers of the replicating network such that:

upon determining that the one or more updates have been made remotely, allowing the updates to be propagated to one or more of the other computers of the replicating network; and upon determining that at least one of the one or more updates was made locally rather than remotely, requesting a version vector from an upstream partner to which the slave computer is connected in the replicating network, and upon receiving the version vector from the upstream partner, using the received version vector to replace the at least one of the one or more updated resources that was updated locally on the slave computer such that:

upon determining that an updated resource on the slave computer comprises a newly created resource that was created locally by the slave computer, indicating that the updated resource should be deleted such that the update mechanism deletes the updated resource from the slave computer; and upon determining that an updated resource on the slave computer was updated locally by the slave computer, indicating that the updated resource should be replaced by a version received from the upstream partner such that the update mechanism requests a version of the updated resource from the upstream partner and replaces the updated resource with the version received from the upstream partner on the slave computer.

16. The apparatus of claim 15, wherein requesting a version vector from an upstream partner further comprises determining whether the received version vector associated with the upstream partner dominates a local version vector except for a local version chain.

* * * * *